(12) United States Patent
Oda (10) Patent No.: US 6,473,601 B1
(45) Date of Patent: Oct. 29, 2002

(54) RECEPTION DIVERSITY CONTROL METHOD AND DIVERSITY RECEIVER

(75) Inventor: Toshiyuki Oda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/384,177

(22) Filed: Aug. 27, 1999

(30) Foreign Application Priority Data

Aug. 28, 1998 (JP) .......................................... 10-243619

(51) Int. Cl.$^7$ ................................................ H04B 1/04
(52) U.S. Cl. ...................... 455/132; 455/343; 455/574; 455/277.1; 370/311
(58) Field of Search ........................... 455/574, 572, 455/67.1, 132, 134, 133, 573, 526, 140, 272, 277.1, 562; 453/343; 370/311, 328, 329, 335, 342, 334, 344, 337; 343/725

(56) References Cited

U.S. PATENT DOCUMENTS

| | | | |
|---|---|---|---|
| 4,823,398 A | * 4/1989 | Hashimoto | 455/134 |
| 5,109,390 A | * 4/1992 | Gilhousen et al. | 370/335 |
| 5,390,357 A | * 2/1995 | Nobusawa et al. | 455/134 |
| 5,566,364 A | * 10/1996 | Mizoguchi et al. | 375/347 |
| 5,621,770 A | * 4/1997 | Zastera | 375/267 |
| 5,630,213 A | * 5/1997 | Vannatta | 455/133 |
| 5,805,989 A | * 9/1998 | Ushida | 455/343 |
| 5,809,090 A | * 9/1998 | Buternowsky et al. | 340/7.21 |
| 5,953,383 A | * 9/1999 | Kojima | 375/347 |
| 6,018,647 A | * 1/2000 | Fitzgerald | 455/135 |
| 6,055,422 A | * 4/2000 | Saitoh | 455/133 |
| 6,161,023 A | * 12/2000 | Johnson et al. | 455/562 |
| 6,301,316 B1 | * 10/2001 | Uchida et al. | 375/343 |
| 6,360,089 B1 | * 3/2002 | Saitoh | 455/131 |

FOREIGN PATENT DOCUMENTS

| | | |
|---|---|---|
| JP | 60-52132 | 3/1985 |
| JP | 2-30321 | 12/1990 |
| JP | 2-303231 | 12/1990 |
| JP | 5-252094 | 9/1993 |
| JP | 6-85721 | 3/1994 |
| JP | 6-224804 | 8/1994 |
| JP | 6-314994 | 11/1994 |
| JP | 1-22891 | 1/1998 |

* cited by examiner

*Primary Examiner*—Dwayne Bost
*Assistant Examiner*—Sonny Trinh
(74) *Attorney, Agent, or Firm*—Scully, Scott, Murphy & Presser (57) ABSTRACT

A reception diversity control method for receiving and demodulating receive signal by multiple receiver circuits, selecting demodulated data received by a receiver circuit in the best reception state from digital demodulated data obtained, the method having the steps of: taking out voice existence information included in the demodulated data selected; and turning on the power sources of all the multiple receiver circuits when the voice existence information indicates that voice information exists, or turning off the power sources of the multiple receiver circuits except a predetermined receiver circuit of the multiple receiver circuits when the voice existence information indicates that no voice information exists.

11 Claims, 7 Drawing Sheets

RECEPTION DIVERSITY CONTROL METHOD AND DIVERSITY RECEIVER

FIELD OF THE INVENTION

This invention relates to a reception diversity control method and a diversity receiver, and more particularly to, a reception diversity control method and a diversity receiver that are designed to reduce the consumed power.

BACKGROUND OF THE INVENTION

Various diversity circuits to obtain the stable reception quality even in case of fading are provided for receivers in mobile communication system, such as a cellular phone.

Diversity receivers with such a diversity circuit use various access systems according to the modulation system. For example, in the TDMA (time division multiple access) system that divides the transmit/receive timing regarding time, at an available slot timing, reception antennas are switched sequentially to search for a best-condition diversity route. At a reception timing just after that, the reception is conducted using this route.

Also, in the FDMA (frequency division multiple access) and CDMA (code division multiple access) systems that conduct the transmission/reception continuously regarding time and there is no time to switch the reception antennas, the post-detection diversity system is used.

Figures 1A, 1B, 1C:
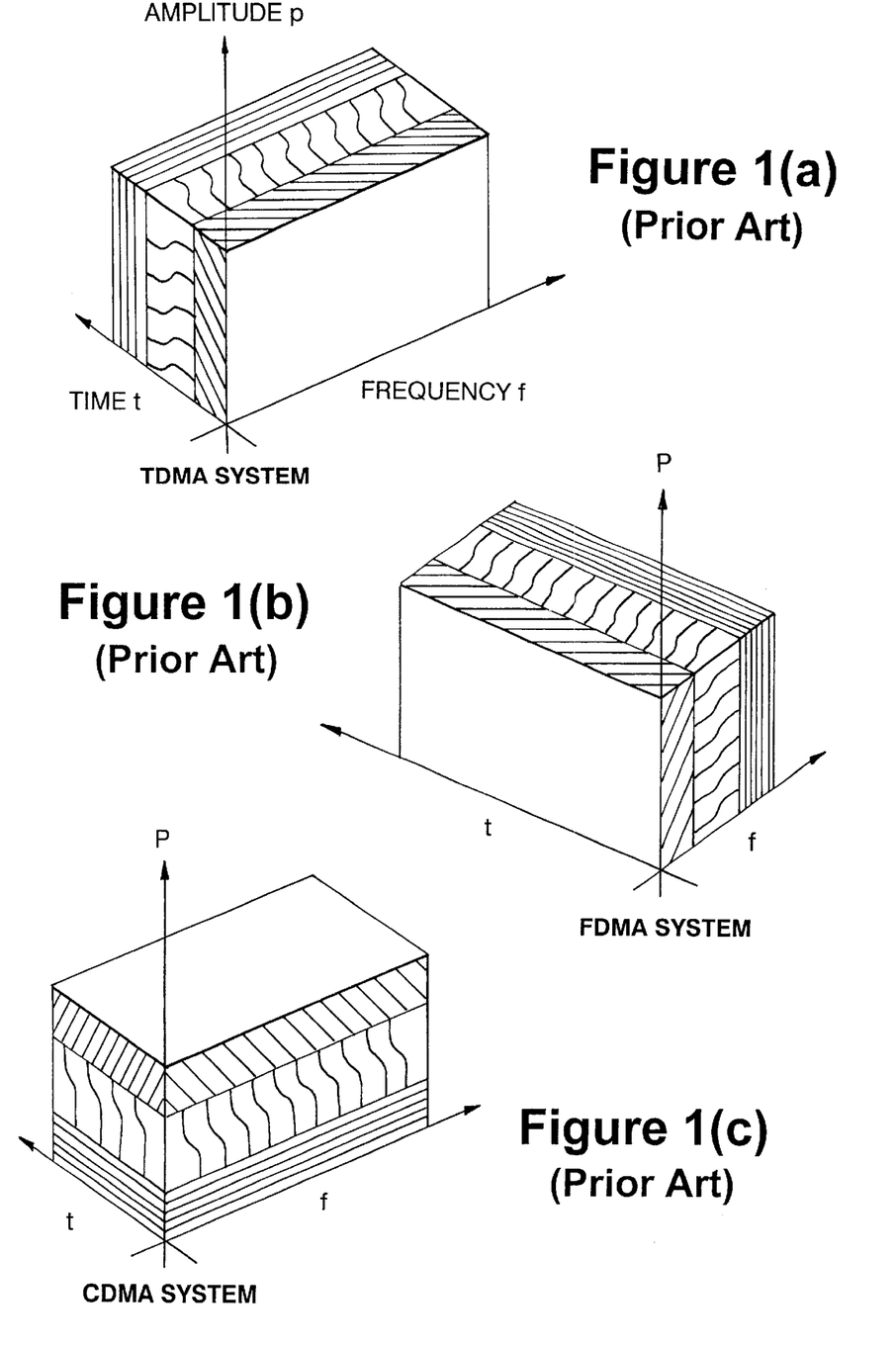
FIG. 1 is a conceptual illustration showing the various modulation systems.

FIG. 1 shows the ideas of TDMA, FDMA and CDMA.

The diversity system gives a large improvement effect to reception quality when a fading occurs on the radio-wave propagation path, but it needs much consumed power since multiple diversity circuits are operated simultaneously. Especially, in the latter post-detection diversity system, multiple series of reception circuits extending from the early-reception-stage low-noise amplification circuit to the detection circuit are necessary to drive, therefore the consumed power must increase.

Also, since in recent years cellular phones are required to be miniaturized, a big capacity of battery cannot be used. So, if the consumed power is much, then the duration time of battery must be shortened. This deteriorates the characteristic of cellular phone.

Japanese patent application laid-open No. 6-224804 (1994) discloses a diversity receiver that is designed to reduce the consumed power to solve the problem above. This diversity receiver is allowed to stop the power supply to the receiver circuit for diversity when all of conditions (1) to (3) below are satisfied.

(1) the average of reception field level is higher than a given threshold.

(2) the fading frequency is lower than a predetermined frequency.

(3) the reception field level is not lowered a predetermined value from a previously measured value.

However, when calling from a car moving in a weak electric field, it is highly probable that this diversity receiver deviates from any one of the conditions (1) to (3). Therefore, the reduction of consumed power is not expectable.

Thus, in the conventional diversity receiver where the power supply to the receiver circuit for diversity is stopped only under the good reception conditions, there is the problem that the consumed power cannot be suppressed under the bad reception conditions.

SUMMARY OF THE INVENTION

Accordingly, it is an object of the invention to provide a reception diversity control method that the consumed power can are reduced even under the bad reception conditions.

It is a further object of the invention to provide a diversity receiver that the consumed power can be reduced even under the bad reception conditions.

According to the invention, a reception diversity control method for receiving and demodulating receive signal by multiple receiver circuits, selecting demodulated data received by a receiver circuit in the best reception state from digital demodulated data obtained, comprises the steps of:

taking out voice existence information included in the demodulated data selected; and turning on the power sources of all the multiple receiver circuits when the voice existence information indicates that voice information exists, or turning off the power sources of the multiple receiver circuits except a predetermined receiver circuit of the multiple receiver circuits when the voice existence information indicates that no voice information exists.

According to another aspect of the invention, a reception diversity control method for receiving and demodulating receive signal by multiple receiver circuits, selecting demodulated data received by a receiver circuit in the best reception state from digital demodulated data obtained, comprises the steps of:

taking out voice amplitude information when conducting the signal processing of the demodulated data selected;

determining whether the amplitude information is higher than predetermined threshold level or not; and turning on the power sources of all the multiple receiver circuits when the amplitude information is higher than the predetermined threshold level, or turning off the power sources of the multiple receiver circuits except a predetermined receiver circuit of the multiple receiver circuits when the amplitude information is lower than the predetermined threshold level.

According to another aspect of the invention, a reception diversity control method for receiving and demodulating receive signal by multiple receiver circuits, selecting demodulated data received by a receiver circuit in the best reception state from digital demodulated data obtained, comprises the steps of:

conducting the D/A conversion of the digital demodulated data to generate analogue voice signal;

measuring the amplitude value of the analogue voice signal;

determining whether the measured amplitude value is higher than a predetermined threshold level or not; and turning on the power sources of all the multiple receiver circuits when the measured amplitude value is higher than the predetermined threshold level, or turning off the power sources of the multiple receiver circuits except a predetermined receiver circuit of the multiple receiver circuits when the measured amplitude value is lower than the predetermined threshold level.

According to another aspect of the invention, a reception diversity control method for receiving and demodulating receive signal by multiple receiver circuits, selecting voice signal received by a receiver circuit in the best reception state from analogue voice signals obtained, comprises the steps of:

measuring the amplitude value of the analogue voice signal;

determining whether the measured amplitude value is higher than a predetermined threshold level or not; and turning on the power sources of all the multiple receiver circuits when the measured amplitude value is higher than the predetermined threshold level, or turning off the power sources of the multiple receiver circuits except a predetermined receiver circuit of the multiple receiver circuits when the measured amplitude value is lower than the predetermined threshold level.

According to another aspect of the invention, a diversity receiver, comprises:

a plurality of receiving antennas;

a plurality of receiver circuits that are provided corresponding to the plurality of receiving antennas and demodulate radio-frequency signal input through the plurality of receiving antennas;

a determination circuit that determines a receiver circuit to be estimated to be in optimum reception state from the plurality of receiver circuits;

a selection circuit that outputs selecting only demodulated data from the receiver circuit in optimum reception state determined by the determination circuit;

a digital signal processor that conducts the signal processing for voice reproduction to the demodulated data selected by the selection circuit;

a decoder circuit that outputs decoding signal processed by the digital signal processor into voice signal;

an information existence determination circuit that takes out voice amplitude information from the digital signal processor, determines that information exists when the amplitude information is higher than a predetermined threshold level, and determines that no information exists when the amplitude information is lower than the predetermined threshold level, a plurality of power sources for receiver circuit that are provided corresponding to the plurality of receiver circuits and are allowed to turn on/off separately power sources supplied to the plurality of receiver circuits; and a power supply circuit controlling circuit that controls the plurality of power sources for receiver circuit to supply power to all the plurality of receiver circuits when the information existence determination circuit determines that information exists, or controls the plurality of power sources for receiver circuit to supply power to only predetermined one of the plurality of receiver circuits when the information existence determination circuit determines that no information exists.

BRIEF DESCRIPTION OF THE DRAWINGS

The invention will be explained in more detail in conjunction with the appended drawings, wherein.

DESCRIPTION OF THE PREFERRED EMBODIMENTS

The preferred embodiments of this invention will be explained below referring to the drawings.

[First Embodiment]

In communicating by a diversity receiver, the diversity effect is necessary only when its user hears a talk from the other party, and it is not necessary when the user himself speaks or when there is no information to be received, e.g., when the other party does not talk. In this embodiment, taking these into account, the reduction of consumed power is realized.

Figure 2:
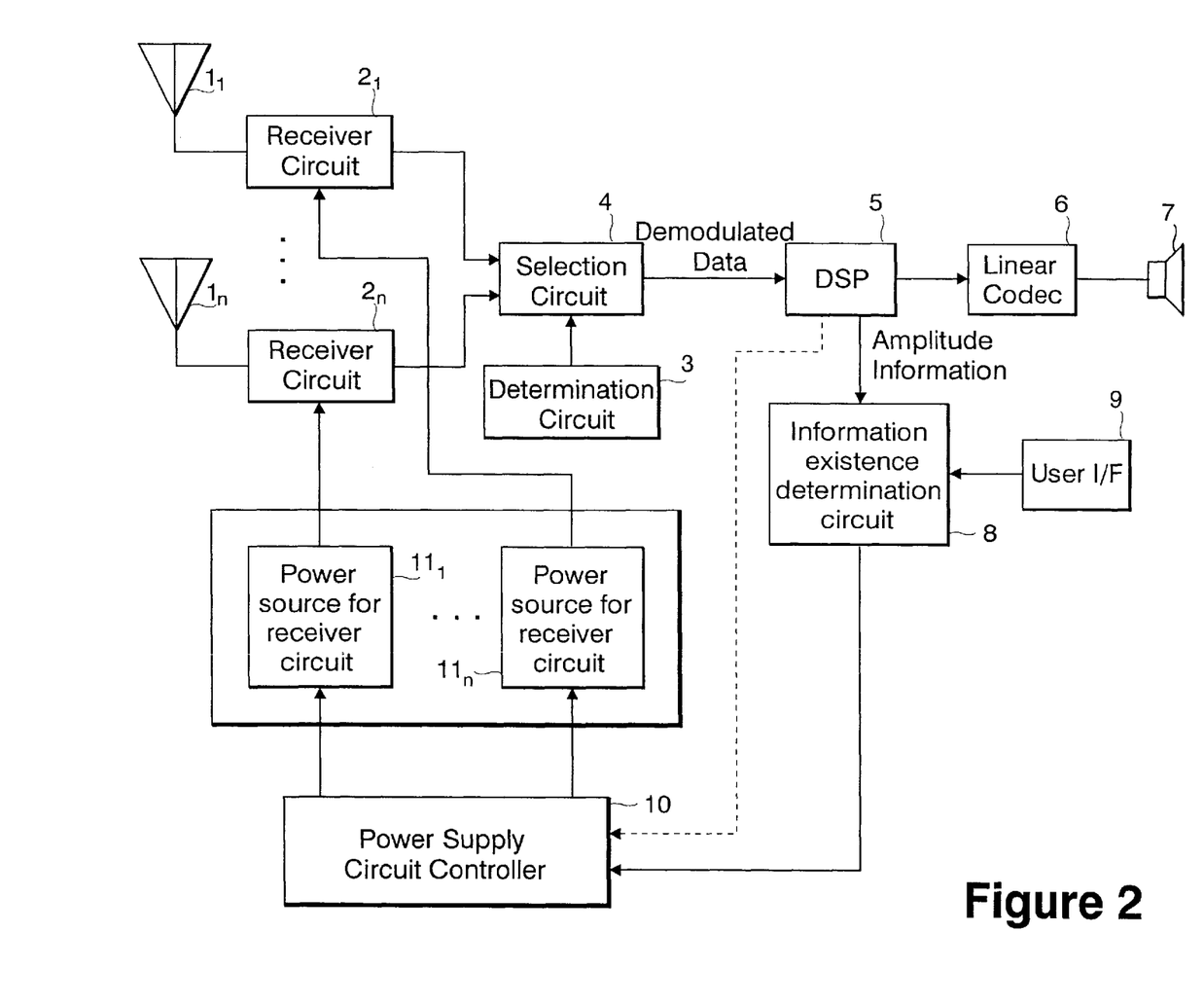
FIG. 2 is a block diagram showing the composition of a diversity receiver in a first preferred embodiment according to the invention.

A diversity receiver in this embodiment comprises n antennas $1_l$ to $1_n$, where the number of diversity channels is n, n systems of receiver circuits $2_l$ to $2_n$, a determination circuit 3, a selection circuit 4, DSP (digital signal processor) 5, a linear CODEC 6, a speaker 7, an information existence determination circuit 8, a user interface (user I/F) circuit 9, a power supply circuit controller 10, and power sources for receiver circuit $11_l$ to $11_n$.

The diversity receiver in this embodiment is used in a digital radio system using DSP as a sound encoding processor.

The n systems of receiver circuits $2_1$ to $2_n$, are provided for the receiving antennas $1_l$ to $1_n$, respectively, and demodulate radio-frequency (RF) signal input through the n antennas $1_l$ to $1_n$.

The determination circuit 3 determines any one of the receiver circuits $2_l$ to $2_n$ that is estimated to be in optimum reception state based on a criterion. The criterion of the determination circuit 3 is, for example, a reception field level, a line quality obtained as the result of decoding and the like.

The selection circuit 4 outputs selecting only demodulated data from the receiver circuit that is determined to be in optimum reception state.

The DSP 5 conducts the signal processing for sound reproduction to the demodulated data selected by the selection circuit 4. Meanwhile, for a system, such as a VOX (voice operating transmission) system that includes sound existence information that informs whether sound information is included in information data transmitted from the transmitter side or not, the DSP 5 sends information as to whether information exists or not directly to the power supply circuit controller 10, as shown with a dotted line in FIG. 2, without sending it to the information existence determination circuit 8. Hereupon, the VOX system is a system that is intended to suppress the consumed power on the transmitter side and does not send out any sound information slot when no voice nor sound is generated.

The linear CODEC 6 decodes converting signal processed by the DSP 5 into voice signal, then outputting it to the speaker 7.

Figure 3:
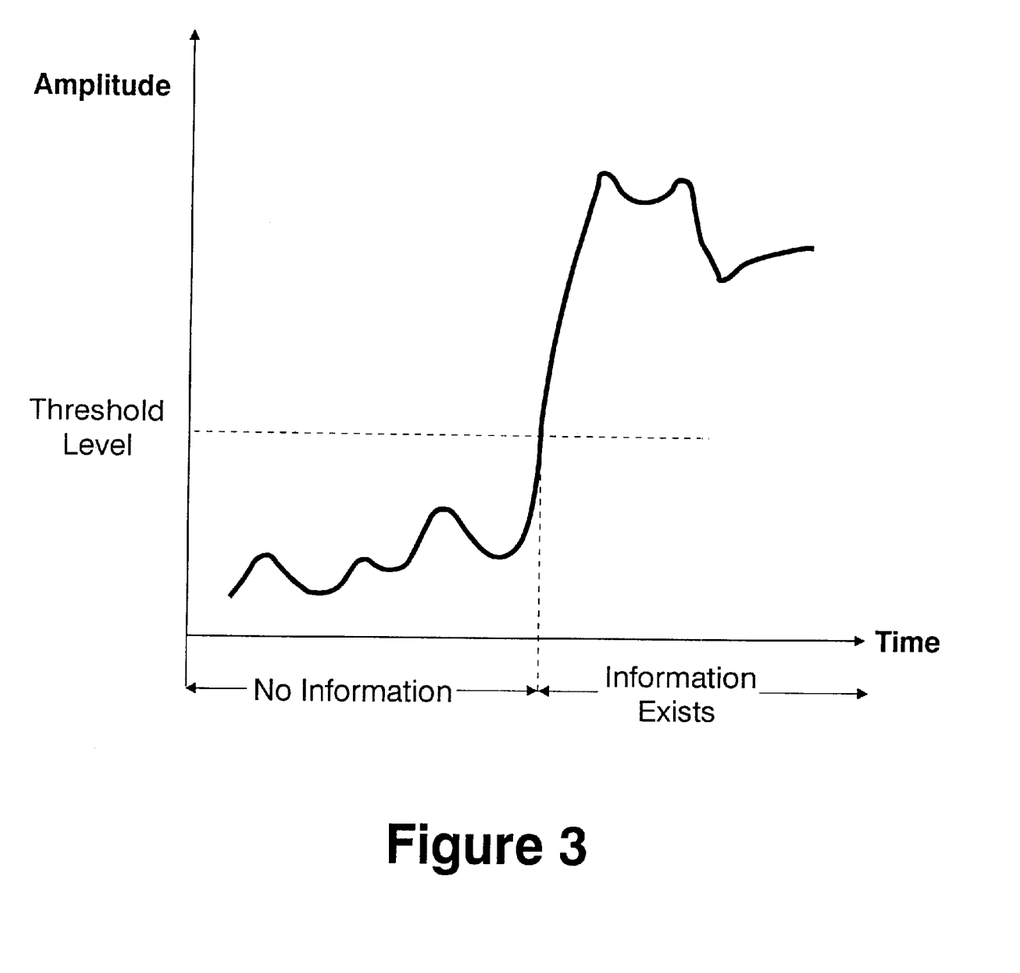
FIG. 3 is an illustrative diagram showing the operation of an information existence determination circuit 8 in FIG. 2.

The information existence determination circuit 8 takes out voice amplitude information from the DSP 5, determines that information exists when the amplitude information is higher than a predetermined threshold level, and determines that no information exits when the amplitude information from the DSP 5 is lower than the predetermined threshold level.

The user I/F circuit 9 is a circuit for changing the threshold level for the information existence determination circuit 8.

The power sources for receiver circuit $11_1$ to $11_n$ are provided corresponding the receiver circuits $2_l$ to $2_n$, respectively, and are allowed to turn on/off separately the power supply to the receiver circuits $2_l$ to $2_n$.

The power supply circuit controller 10 controls the power sources for receiver circuit $11_1$ to $11_n$ to supply power to all the n systems of receiver circuits $2_1$ to $2_n$ when the information existence determination circuit 8 determines that information exists, and controls the power sources for receiver circuit $11_1$ to $11_n$ to supply power to only a predetermined one of the n systems of receiver circuits $2_1$ to $2_n$ when the information existence determination circuit 8 determines that no information exists.

Figure 4:
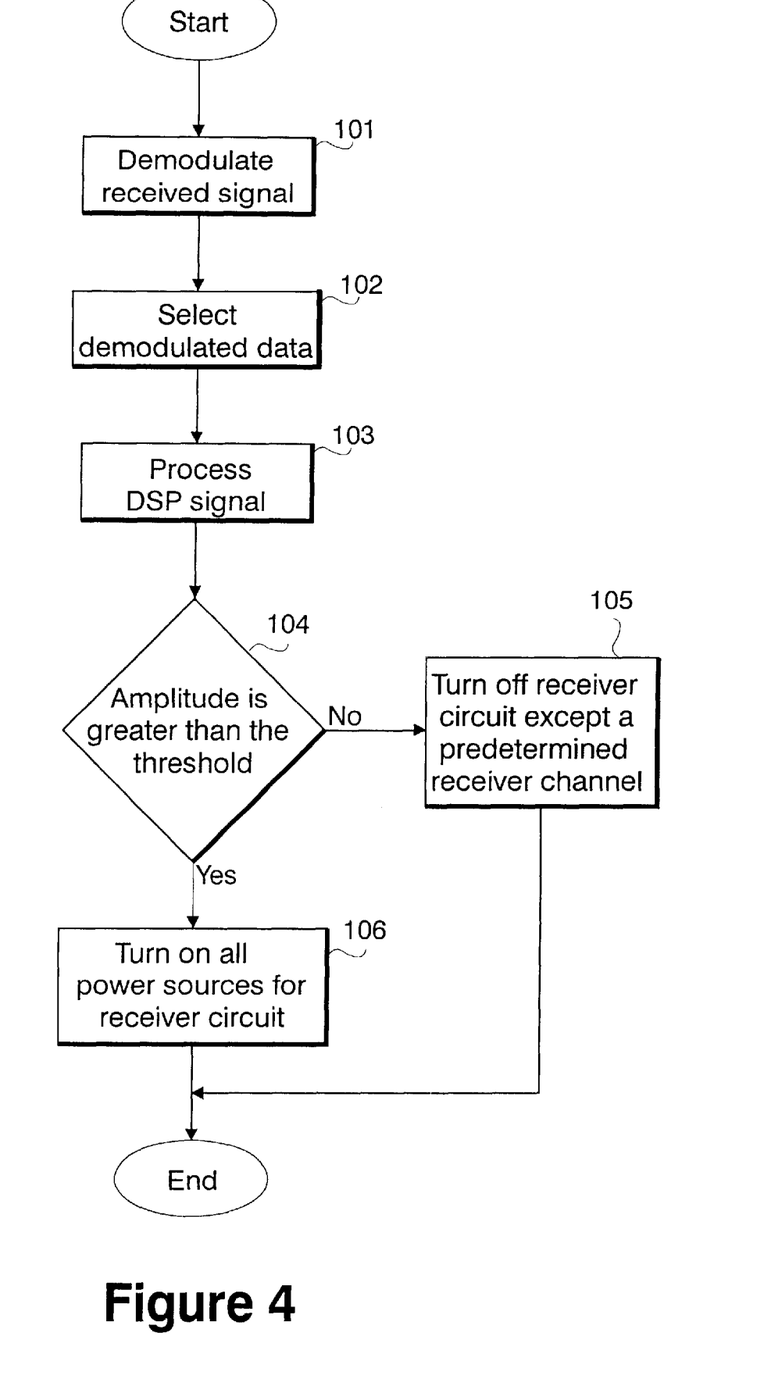
FIG. 4 is a flow chart showing the operation of the diversity receiver in FIG. 2.

Next, the operation of the diversity receiver in this embodiment is explained in detail referring to the flow chart in FIG. 4.

Radio-frequency (RF) signals input through the n antennas $1_1$ to $1_n$ are demodulated by the n systems of receiver circuits $2_1$ to $2_n$, respectively (step 101).

Only one of the n kinds of demodulated data is determined as optimum demodulated data by the determination circuit 3, one system of data selected is then output by the selection circuit 4 (step 102).

The demodulated data thus selected is subject to the signal processing for voice reproduction by the DSP 5, passed through the linear CODEC 6, output as a voice from the speaker 7 (step 103). Also, at the same time, when voice amplitude information can be taken out by the DSP 5, the amplitude information is input to the information existence determination circuit 8. The case that voice information cannot be taken out from the DSP 5 is explained later in the second embodiment.

Then, the information existence determination circuit 8 determines whether the amplitude information is higher than a threshold level (step 104).

At step 104, when the amplitude information is lower than the threshold level, signal indicating 'no information' is sent to the power supply circuit controller 10, and the reception channels except a predetermined reception channel is turned off (step 105).

On the other had, at step 104, when the amplitude information is higher than the threshold level, signal indicating that 'information exists' is sent to the power supply circuit controller 10, and all the reception channels $2_1$ to $2_n$ are turned on (step 106).

Thus, by repeating the process in FIG. 4 periodically, the diversity receiver in this embodiment conducts the receiving operation by only one receiver circuit when no information is included in received signal, and it conducts the normal diversity receiving operation by all the receiver circuits when information is included in received signal.

In the diversity receiver in this embodiment, when a time for hearing voice signal from the other party and a time for talking to the other party are equal and two diversity systems are provided, the consumed power in reception can be reduced 50% compared with the case that the diversity receiver in this embodiment is not used. Therefore, when this embodiment is applied to a radio receiver, such as a cellular phone, that conducts mobile communications with a battery loaded, the duration time of battery can be extended significantly.

Also, since the diversity operation is turned on/off according to only whether information is included in received signal, the reduction of consumed power can be realized even under bad reception conditions.

[Second Embodiment]

The second preferred embodiment of the invention is explained below.

Figure 5:
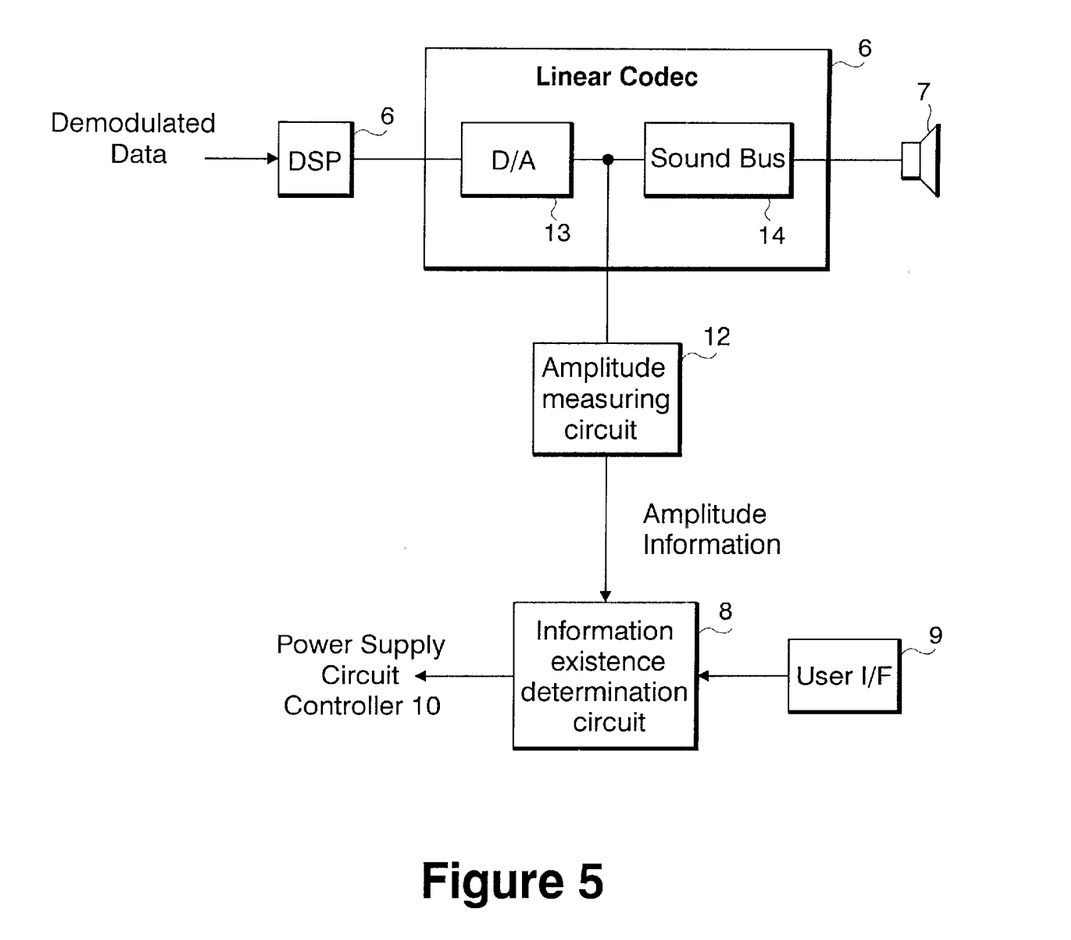
FIG. 5 is a block diagram showing the composition of a diversity receiver in a second preferred embodiment according to the invention.

FIG. 5 is a block diagram showing the composition of a diversity receiver in the second preferred embodiment according to the invention. Here, like components are indicated using like reference numerals in FIG. 2.

The diversity receiver in this embodiment is composed of an amplitude measuring circuit 12 that is added newly to the diversity receiver in the first embodiment in FIG. 2. Also, the information existence determination circuit 8 in this embodiment determines whether information exists or not, based on not amplitude information from the DSP 5 but amplitude information from the amplitude measuring circuit 12.

Also, the linear CODEC 6 is composed of a D/A converter 13 and a sound(voice) bus 14.

The amplitude measuring circuit 12 measures the amplitude value of analogue signal converted the D/A converter 13 in the linear CODEC 6, sending the measured value as amplitude information to the information existence determination circuit 8.

In this embodiment, the determination as to whether information in receive signal exists can be conducted even when the information existence determination circuit 8 cannot take out voice amplitude information from the DSP 5.

[Third Embodiment]

The third preferred embodiment of the invention is explained below.

Figure 6:
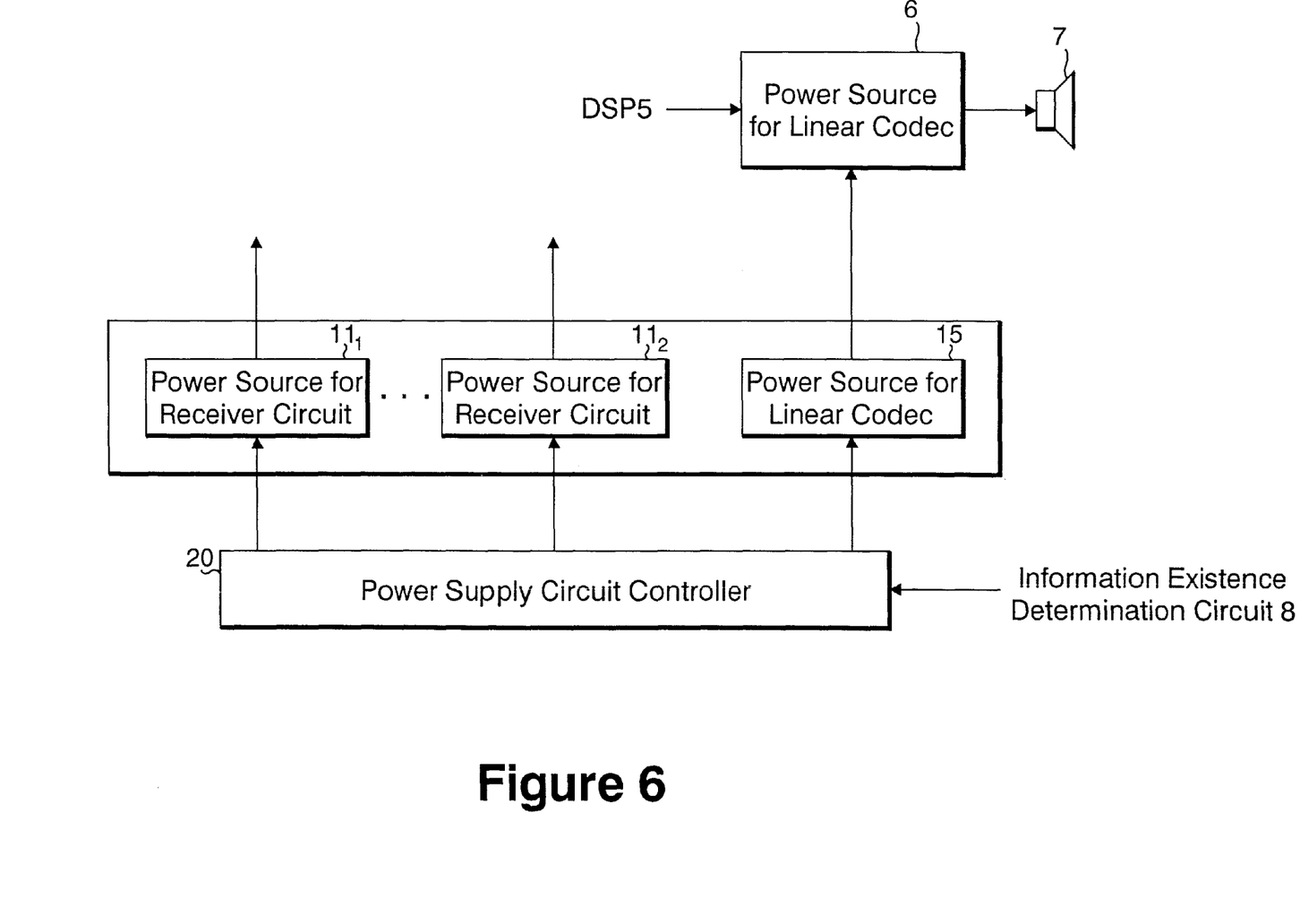
FIG. 6 is a block diagram showing the composition of a diversity receiver in a third preferred embodiment according to the invention.

FIG. 6 is a block diagram showing the composition of a diversity receiver in the third preferred embodiment according to the invention. Here, like components are indicated using like reference numerals in FIG. 2.

In this embodiment, a power supply circuit controller 20 controls not only the power sources for receiver circuit $11_1$ to $11_n$ but also a power source for linear CODEC 15 to supply power to the linear CODEC 6. Thus, when the information existence determination circuit 8 determines that 'no information exists', it turns off not only the receiver circuits $2_1$ to $2_n$ but also the power source 15 for the linear CODEC 6, therefore the consumed power can be further reduced.

The first to third embodiments explained above can be applied to any of CDMA, TDMA and FDMA multi-access systems. Also, they can be applied to any of FM, AM and like modulation systems.

[Fourth Embodiment]

The fourth preferred embodiment of the invention is explained below.

Figure 7:
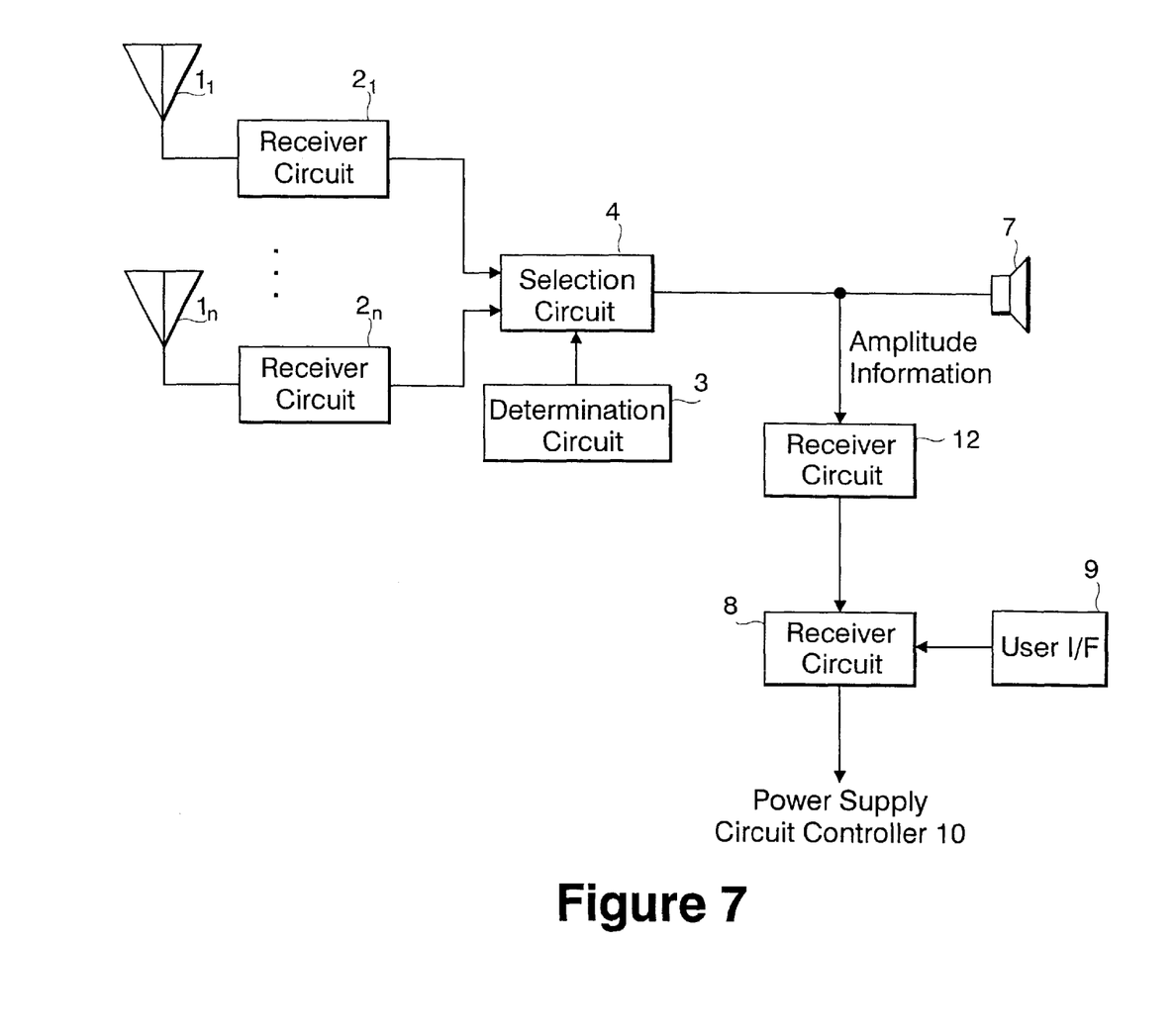
FIG. 7 is a block diagram showing the composition of a diversity receiver in a fourth preferred embodiment according to the invention.

FIG. 7 is a block diagram showing the composition of a diversity receiver in the fourth preferred embodiment according to the invention. Here, like components are indicated using like reference numerals in FIG. 2.

Although the first to third embodiments are applied to a digital diversity receiver, the diversity receiver in this embodiment is applied to an analogue diversity receiver.

In this embodiment, since demodulated data selected by the selection circuit 4 is analogue voice signal, the amplitude measuring circuit 12 measures the amplitude value of voice signal and the information existence determination circuit 8 determines whether information exists.

The operation of the other components in this embodiment is similar to that in the first to third embodiments, and the explanations thereof are omitted.

Also, this embodiment can be applied to any of FM, AM and like modulation systems.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A reception diversity control method for receiving and demodulating receive signal by multiple receiver circuits, selecting demodulated data received by a receiver circuit in the best reception state from digital demodulated data obtained, comprising the steps of:
  taking out voice existence information included in said demodulated data selected; and
  turning on the power sources of all said multiple receiver circuits when said voice existence information indicates that voice information exists, or turning off the power sources of said multiple receiver circuits except a predetermined receiver circuit of said multiple receiver circuits when said voice existence information indicates that no voice information exists.

2. A reception diversity control method for receiving and demodulating receive signal by multiple receiver circuits, selecting demodulated data received by a receiver circuit in the best reception state from digital demodulated data obtained, comprising the steps of:
  taking out voice amplitude information when conducting the signal processing of said demodulated data selected;
  determining whether said amplitude information is higher than a predetermined threshold level or not; and
  turning on the power sources of all said multiple receiver circuits when said amplitude information is higher than the predetermined threshold level, or turning off the power sources of said multiple receiver circuits except a predetermined receiver circuit of said multiple receiver circuits when said amplitude information is lower than the predetermined threshold level.

3. A reception diversity control method for receiving and demodulating receive signal by multiple receiver circuits, selecting demodulated data received by a receiver circuit in the best reception state from digital demodulated data obtained, comprising the steps of:
  conducting the D/A conversion of said digital demodulated data to generate analogue voice signal;
  measuring the amplitude value of said analogue voice signal;
  determining whether said measured amplitude value is higher than a predetermined threshold level or not; and
  turning on the power sources of all said multiple receiver circuits when said measured amplitude value is higher than the predetermined threshold level, or turning off the power sources of said multiple receiver circuits except a predetermined receiver circuit of said multiple receiver circuits when said measured amplitude value is lower than the predetermined threshold level.

4. A reception diversity control method for receiving and demodulating receive signal by multiple receiver circuits, selecting voice signal received by a receiver circuit in the best reception state from analogue voice signals obtained, comprising the steps of:
  measuring the amplitude value of said analogue voice signal;
  determining whether said measured amplitude value is higher than a predetermined threshold level or not; and
  turning on the power sources of all said multiple receiver circuits when said measured amplitude value is higher than the predetermined threshold level, or turning off the power sources of said multiple receiver circuits except a predetermined receiver circuit of said multiple receiver circuits when said measured amplitude value is lower than the predetermined threshold level.

5. A reception diversity control method, according to claim 1, further comprising the step of:
  turning off the power source of a circuit to decode said demodulated data when said voice existence information indicates that no voice information exists.

6. A reception diversity control method, according to claim 2, further comprising the step of:
  turning off the power source of a circuit to decode said demodulated data when said amplitude information is lower than the predetermined threshold value.

7. A reception diversity control method, according to claim 3, further comprising the step of:
  turning off the power source of a circuit to decode said demodulated data when said measured amplitude value is lower than the predetermined threshold value.

8. A diversity receiver, comprising:
  a plurality of receiving antennas;
  a plurality of receiver circuits that are provided corresponding to said plurality of receiving antennas and demodulate radio-frequency signal input through said plurality of receiving antennas;
  a determination circuit that determines a receiver circuit to be estimated to be in optimum reception state from said plurality of receiver circuits;
  a selection circuit that outputs selecting only demodulated data from said receiver circuit in optimum reception state determined by said determination circuit;
  a digital signal processor that conducts the signal processing for voice reproduction to said demodulated data selected by said selection circuit;
  a decoder circuit that outputs decoding signal processed by said digital signal processor into voice signal;
  an information existence determination circuit that takes out voice amplitude information from said digital signal processor, determines that information exists when the amplitude information is higher than a predetermined threshold level, and determines that no information exists when the amplitude information is lower than the predetermined threshold level,
  a plurality of power sources for receiver circuit that are provided corresponding to said plurality of receiver circuits and are allowed to turn on/off separately power sources supplied to said plurality of receiver circuits; and
  a power supply circuit controlling circuit that controls said plurality of power sources for receiver circuit to supply power to all said plurality of receiver circuits when said information existence determination circuit determines that information exists, or controls said plurality of power sources for receiver circuit to supply power to only predetermined one of said plurality of receiver circuits when said information existence determination circuit determines that no information exists.

9. A diversity receiver, according to claim 8, wherein:
  said power supply circuit controlling circuit controls the power of said decoder circuit to be turned off when said information existence determination circuit determines that no information exists.

10. A diversity receiver, according to claim 8, further comprising:
  a user interface circuit that is used to change the threshold level of said information existence determination circuit.

11. A diversity receiver, according to claim 9, further comprising:
  a user interface circuit that is used to change the threshold level of said information existence determination circuit.

* * * * *